United States Patent [19]
Littlefield

[11] 4,220,823
[45] Sep. 2, 1980

[54] SELECTIVELY CONTROLLED DIGITAL PAD

[75] Inventor: Bruce G. Littlefield, Honeoye Falls, N.Y.

[73] Assignee: Stromberg-Carlson Corporation, Tampa, Fla.

[21] Appl. No.: 927,067

[22] Filed: Jul. 21, 1978

[51] Int. Cl.² ............................................. H04M 1/76
[52] U.S. Cl. ............................. 179/16 F; 179/2 DP; 370/53
[58] Field of Search ............. 179/16 F, 16 EA, 18 E, 179/170 R, 15 A, 15 BL, 2 DP, 18 ES; 364/200 MS File, 900 MS File

[56] References Cited

U.S. PATENT DOCUMENTS

| | | | |
|---|---|---|---|
| 3,806,658 | 4/1974 | Anderson et al. | 179/16 F |
| 3,902,165 | 8/1975 | Artom | 179/15 BL |
| 3,956,593 | 5/1976 | Collins et al. | 179/15 A |
| 3,967,250 | 6/1976 | Senda et al. | 364/200 |
| 4,057,695 | 11/1977 | Ohno | 179/170 R |

*Primary Examiner*—Bernard Konick
*Assistant Examiner*—Randall P. Myers
*Attorney, Agent, or Firm*—Craig & Antonelli

[57] ABSTRACT

In a digital data transmission system including one or more matrix switches in which data in digital form is stored in a send memory during one selected time slot of a recurring time frame, transferred to a receive memory and sent out from the receive memory during another time slot of the recurring time frame to establish desired data paths through the switch between selected inputs and outputs, means is provided in the form of a programmable read only memory to control the insertion loss of each data path in a selective manner.

14 Claims, 16 Drawing Figures

TIMING DIAGRAM

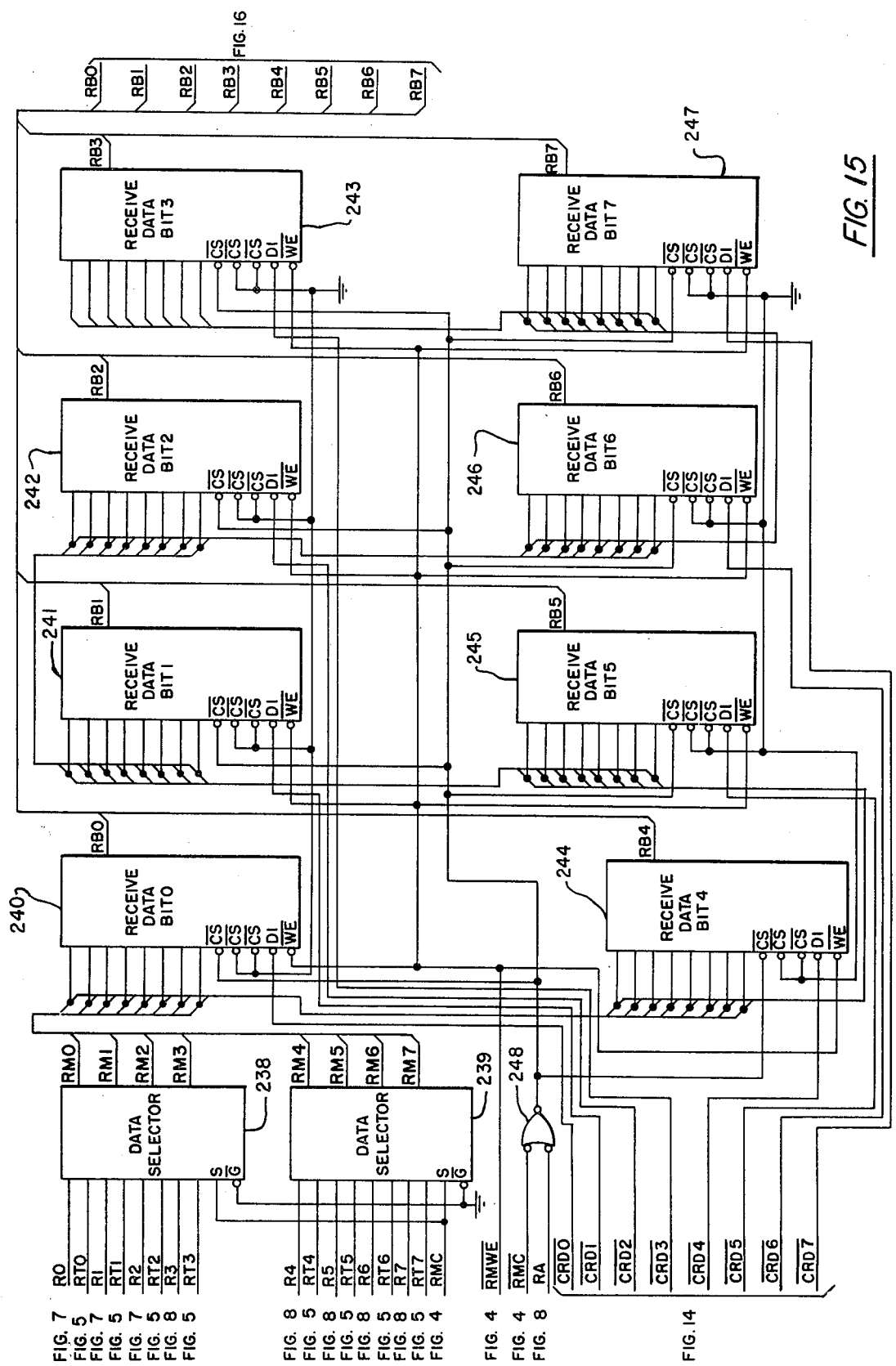

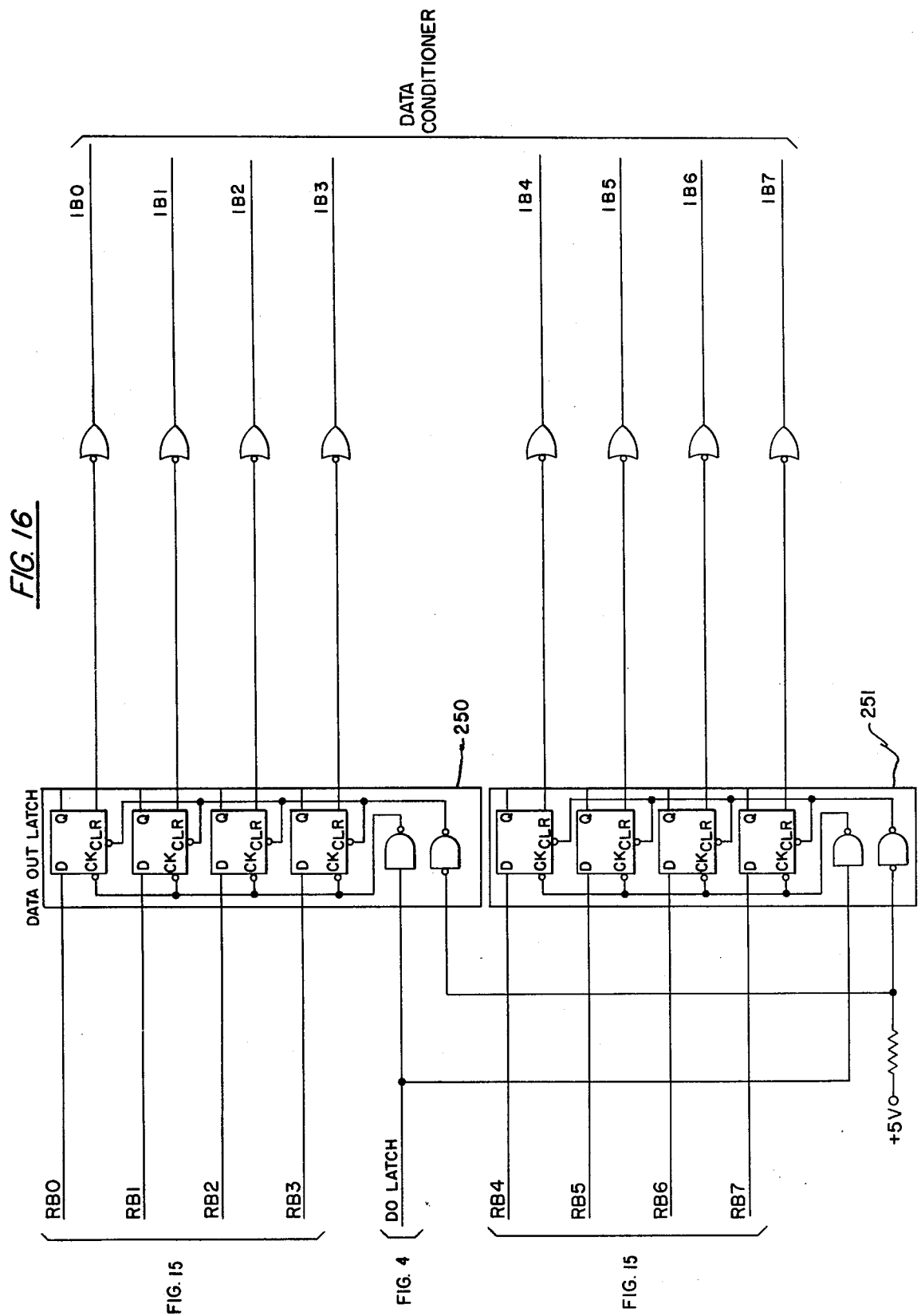

SELECTIVELY CONTROLLED DIGITAL PAD

The present invention relates in general to digital transmission systems, and more particularly, to improvements in a digital data switch for use in an electronic telephone system.

In prior U.S. Application Ser. No. 885,181 of Klaus Gueldenpfennig et al, filed Nov. 25, 1977, now abandoned, and assigned to the same assignee as the present application, there is disclosed a digital private branch exchange, in which a pulse code modulation circuit connected to a sending telephone station samples each of a number of input analog terminations, which may be derived from line circuits, central office trunk circuits, tie trunk circuits, etc. The samples are converted to eight bit pulse code modulation words and the words are multiplexed to provide a serial digital output in a modified D3 channel bank format. Each of the samples results in a "frame" of data consisting of one eight bit PCM word for each of the input analog signals and an additional bit used for frame synchronization at the receiving end. The data is supplied to a data conditioner, which converts the eight bit serial data of D3 format to an eight bit parallel PCM word, and supplies this data to a data switch arrangement.

A typical data switch arrangement as used in digital switching systems includes a plurality of matrix switches along with an expander-concentrator to interconnect the matrix switches for time slot interchange. Data is transferred through the matrix switches and the expander-concentrator by time slot interchange in time slots of a repetitive time frame assigned and controlled by a central processing unit. Each matrix switch generally includes a send data memory and a receive data memory, and the system clock controls the operation of these memories in such a way that data from the data conditioner is applied to and stored in the send memory at the same time that data stored previously in the receive memory is gated out to the data conditions. During the second half of the clock cycle, the data which has been stored in the send memory undergoes time slot interchange by transferring it from the send memory into the receive memory. Thus, data from a send telephone station will be shifted into the send memory of a first matrix switch during the first half of the clock cycle. During the second half of the clock cycle, the data which has been stored in the send memory of the first matrix switch will be transferred through the expander-concentrator to the receive memory of a second matrix switch, and during the first half of the following clock cycle this data stored in the receive memory of the second matrix switch will be shifted out. The eight bit parallel PCM word received from the second matrix switch will be converted to serial format and outputted to the pulse code modulation circuit which will convert the eight bit PCM word to voice frequency and apply it to the receive telephone station.

Telephone communication systems, such as disclosed in the above-mentioned Gueldenpfennig et al application Ser. No. 855,181, for example, are generally designed to provide a nominal insertion loss for all transmission paths through the system, which provides the proper level for most types of connections. However, certain types of calls require an additional insertion loss for proper attenuation, so that, for such calls the nominal insertion loss provided by the system is insufficient. For example, line-to-line connections may require a greater insertion loss than line-to-tie trunk connections and an even greater insertion loss than line-to-central office trunk connections.

It is therefore an object of the present invention to provide a selectively controlled digital pad for providing variable insertion loss in a digital transmission system.

It is another object of the present invention to provide a digital switch arrangement for a telephone communication system which is capable of providing any amount of insertion loss or insertion gain in any communication connection through the system.

It is a further object of the present invention to provide a simplified arrangement for controlling the insertion loss of any communication connection through a telephone communication system on the basis of the type of ports involved in the system.

In accordance with the present invention, pad control for a digital telephone communication system is implemented within the digital switch on a real time basis during time slot interchange on the cross office highway extending between the send memory and the receive memory through the expander-concentrator in the matrix switch. This is accomplished by inserting a programmable read only memory (PROM) in the cross office highway for selectively converting the digital signals applied thereto in such a way as to provide the necessary insertion loss. This PROM may be addressed in such a way as to provide a selective one of a plurality of pads for insertion into the transmission path.

Data points within each particular pad are accessed by using as an address the parallel PCM data at the cross office highway input to the matrix switch, each data point representing a different digital level adjusted to the particular insertion loss or gain of the selected pad. Pad selection is effected by storing the address of the pad in a random access memory (RAM) under control of the CPU in the system on the basis of the type of communication connection to be established through the system. Thus, each time the CPU assigns a cross office highway through the matrix switch, a pad in the PROM will also be selected to provide the proper insertion loss.

Since the pad control circuit is disposed within the matrix switch itself, through which all PCM data must pass, it is clear that any positive loss which has been programmed into the PROM will be inserted in any selected transmission path. Thus, a different insertion loss can be provided for different types of communication connections in a simple and reliable manner.

These and other objects, features, and advantages of the present invention will become more apparent from a detailed description of an exemplary embodiment thereof, when taken in conjunction with the accompanying drawings, in which:

FIGS. 15 and 16 are schematic circuit diagrams of the receive data memory.

Figure 1:
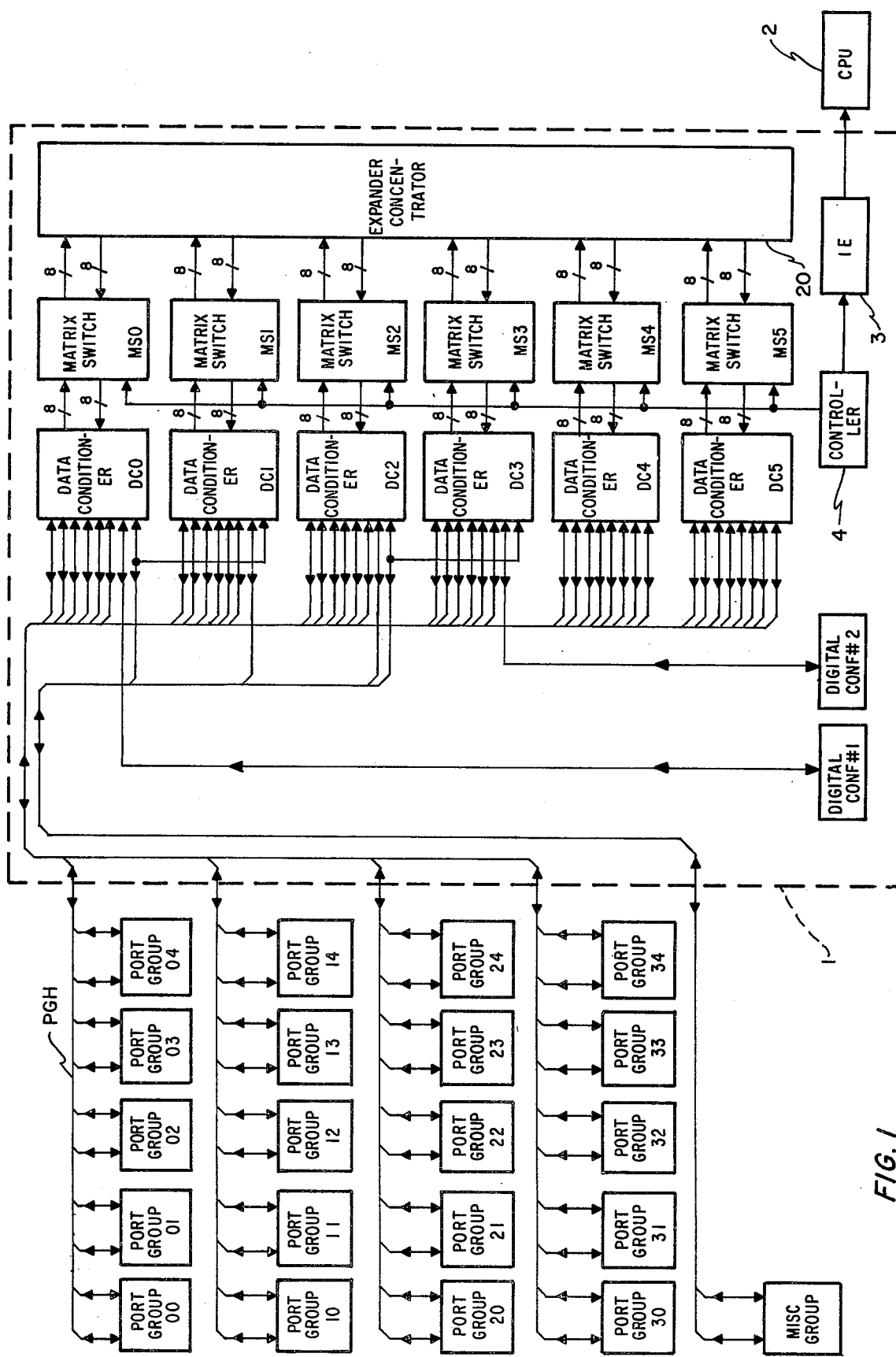
FIG. 1 is a schematic block diagram of a digital transmission network to which the present invention may be applied.

FIG. 1 illustrates a typical example of a digital transmission network, of the type disclosed in the above-mentioned U.S. patent application Ser. No. 855,181, to which the present invention may be applied. Such a system provides six matrix switches MS0–MS5 in the common control 1, with each matrix switch being capable of handling data derived from four port groups or three port groups and a miscellaneous cell and another lead from a digital conference circuit. Two pulse code modulation circuits in each port group provide a line on the port group highway to the digital transmission network. Thus, each of the data conditioners DC0–DC5 has eight incoming lines each carrying serial data associated with twenty-four ports, and converts the serial data to eight bit parallel words and transfers the eight bit parallel words to the associated matrix switch MS0–MS5.

Time slot interchange in the system is effected by the central processing unit 2 through the interrupt encoder 3 and the controller 4, the latter directly controlling the respective matrix switches MS0–MS5 in accordance with instructions received from the central processing unit 2. Each matrix switch operates on an essentially standard time-division multiplex concept for time slot interchange. A set of eight memories are used on the send side to receive the eight bit words from the data conditioner and a set of eight memories are used on the receive side to store the data required for output to the data conditioner. The memories are time shared with the first half of the clock cycle being used for input/output to the line side interface (data conditioner) and the second half of the clock cycle for time slot interchange.

Since there are 192 unique inputs applied to the matrix, only 192 memory locations are utilized for input/output data. However, due to the frame data bit incorporated in the serial data stream, there are in reality 193 time slots available for time slot interchange. During the first half of the clock cycle, memory addressing is under control of a sequential counter which steps through the 192 memory addresses. Data for the equivalent line address is clocked into the send memory and from the receive memory at this time. During the second half of the clock cycle, memory addressing is under control of the call store memories which transfer data from the send memory to the receive memory in accordance with the preprogrammed data received from the central processing unit 2 via the controller 4 and stored in the store memories. The expander-concentrator 20 enables time slot interchange between any of six matrix send memories to any one of the six matrix receive memories.

The call store memories in each matrix switch are programmed by the controller 4 which in turn receives its direction from the central processing unit 2. The call store memory consists of twenty-three individual memories. Eight memories store the send port number with a ninth memory used to designate whether the time slot is active or inactive, i.e., reserve. Eight memories store the receive port number with a ninth memory being used to designate the active-inactive status. Five memories are then provided to store the cross-office highway number through the expander-concentrator 20.

The controller 4, under control of the central processing unit 2, has the capability to write data into any given time slot in the call store memories, read data previously stored in any given time slot, or search the receive store memory to determine the time slot a given receive port number has been stored in. The send active-inactive and receive active-inactive memories provide the ability to store call data in the matrix and reserve time slots while data transfer is inhibited. The expander-concentrator 20 is a space-divided network which permits up to six matrices to be interconnected, and consists basically of combinational logic which steers the data by the cross office highway address information supplied from the matrix cross memory stores.

Figure 2:
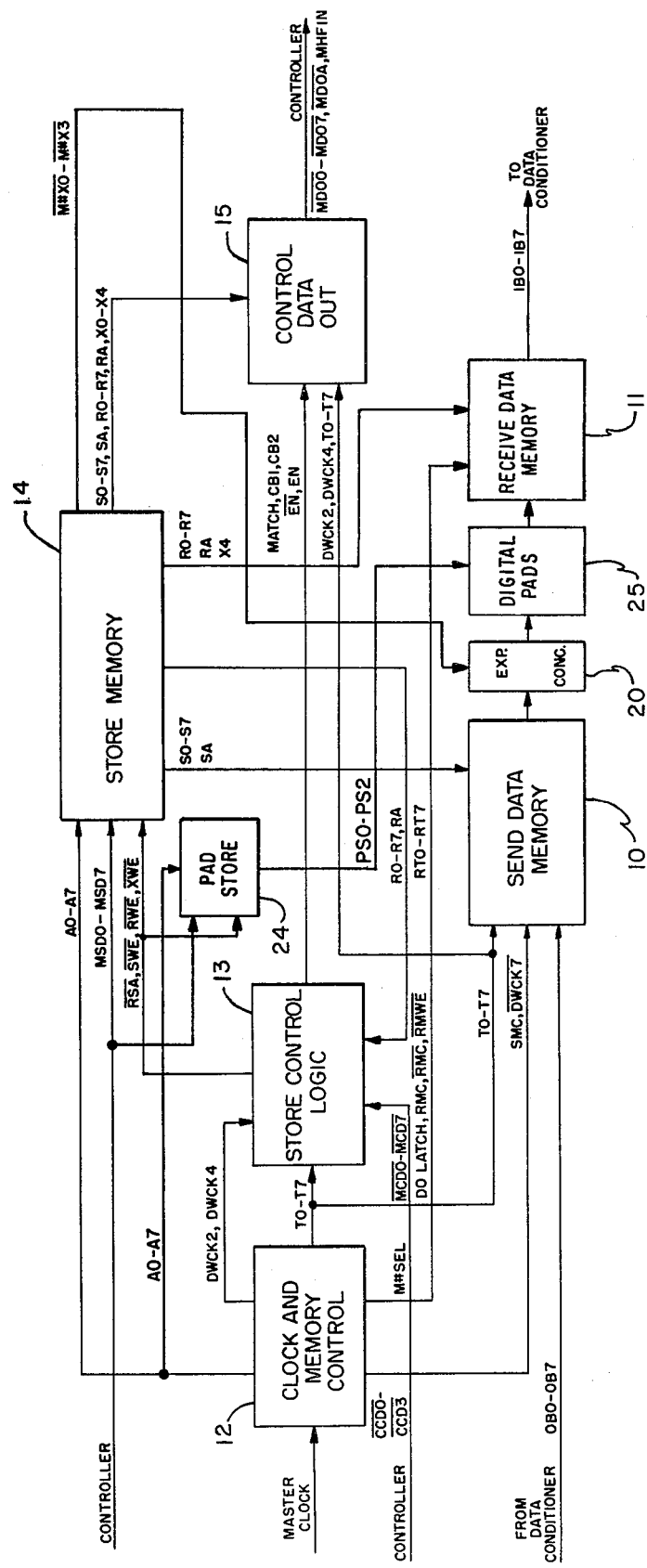
FIG. 2 is a schematic block diagram of the matrix switch.

FIG. 2 is a general block diagram of the matrix switch, the principal components of which are the send data memory 10, the receive data memory 11, and the store memory 14. The matrix switch is a time division multiplex switch which interchanges eight bit parallel time slots from the input to the output, the matrix having a single eight-bit wide cross office highway output and a dual eight bit wide cross office highway input. Interconnection of a plurality of matrices can be accomplished by use of the space-divided expander/concentrator 20.

The operating speed of the matrix switch is 1.544 MHz, the combined effect of the 8,000 sample per second rate and 193rd framing bit with the D3 format resulting in 192 input-output time slots and 193 switching time slots, which are generated within the clock and memory control 12 along with other control signals necessary to the functioning of the matrix switch. Functionally, the matrix switch performs continuous synchronous time slot interchange between the send data memory 10 and the receive data memory 11 through the expander/concentrator 20 under control of the address data contained in the store memory 14. The matrix is transparent with respect to time slot data, the data out being equivalent to the data in which no restrictions on time slot contents or format.

The store control logic 13 is responsive to the clock and control signals from the clock and memory control 12 as well as control and address signals from the controller 4, which is responsive to commands from the central processing unit 2. The store control logic 13 is basically responsible for the comparison of address information received from the controller with stored information in the memory store 14 and serves to control the three basic functions of the matrix switch, i.e., read, write, and search, once a match has been detected between the received and stored address information. The control data output circuit 15 is responsive to the store control logic 13 for forwarding to the controller 4 information stored in the store memory 14 upon request from the controller 4. Thus, the matrix switch provides not only time slot interchange of data under control of the controller 4, but also provides to the controller 4 upon request data which is stored in the store memory 14.

In accordance with the present invention, there is also provided in the matrix switch a pad control circuit consisting of pad store 24 and the digital pads 25. The pad store 24 stores for each assigned cross office highway through the expander-concentrator 20 a pad identification which is received from the central processing unit 2 via the controller 4. This pad identification is then read out to the digital pads 25, which are disposed in the transmission path between the send memory 10 and the receive memory 11, in response to the clock and control signals from the clock and memory control 12.

The digital pads 25 are formed by a programmable read only memory (PROM) divided into selectable memory areas, each of which represents a respective pad. The pads are selected during each time slot in accordance with the pad identification signals received from the pad store 24 and the data points within each particular pad are accessed using as an address the parallel PCM data received on the transmission path from the send memory 10. Each of the data points within a particular pad is responsive to a different digital level of input signal and provides an output at an adjusted level in accordance with the required insertion loss to be provided by that pad.

The pad control circuit is capable of providing any amount of positive insertion loss for use in the transmission path. Negative insertion loss (positive insertion gain) can also be introduced via the pad control circuit, since the CPU can store any values in the data points of the respective areas of the PROM forming the respective pads. However, there may be a tendency to clip for large voltage swings when using an eight bit code (the eighth bit usually being a sign bit), and therefore, to determine the pad value required to yield a particular insertion loss, the nominal insertion loss of the system is subtracted from the required loss and the remainder is the loss to be programmed into the PROM.

In order to provide a better understanding of the present invention, the manner in which the invention is specifically applied to the digital branch exchange disclosed in the above-referenced Gueldenpfennig et al application will be described as a preferred embodiment; however, it should be understood that the invention has general application to digital transmission systems employing matrix switches and is not restricted to use in the specific system described or in telephone systems in general.

Figure 3:
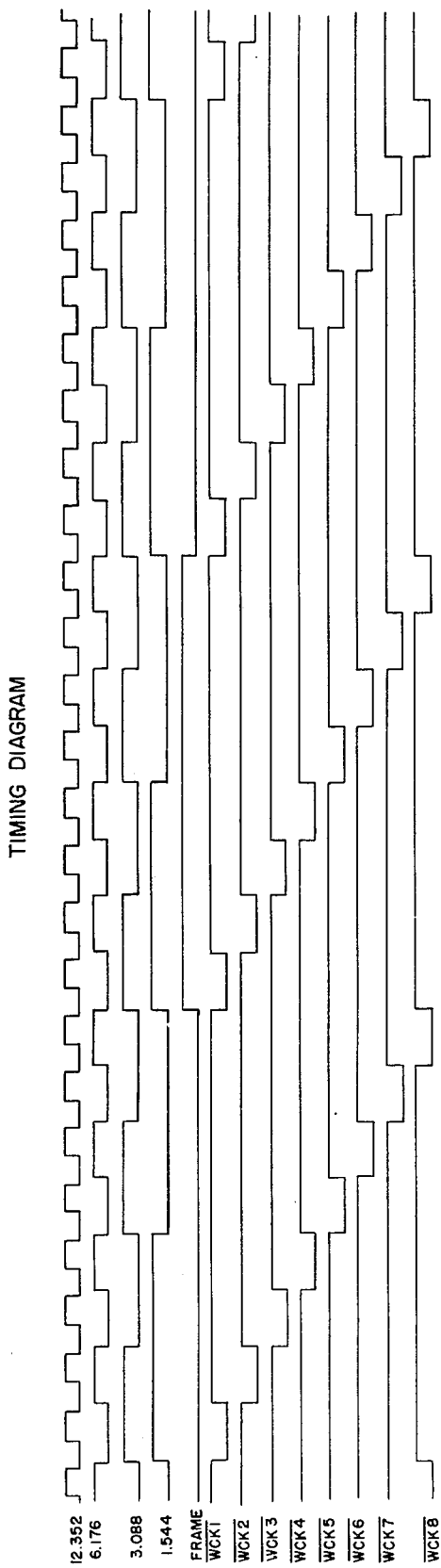
FIG. 3 is a waveform diagram illustrating system clock signals.
Figure 4:
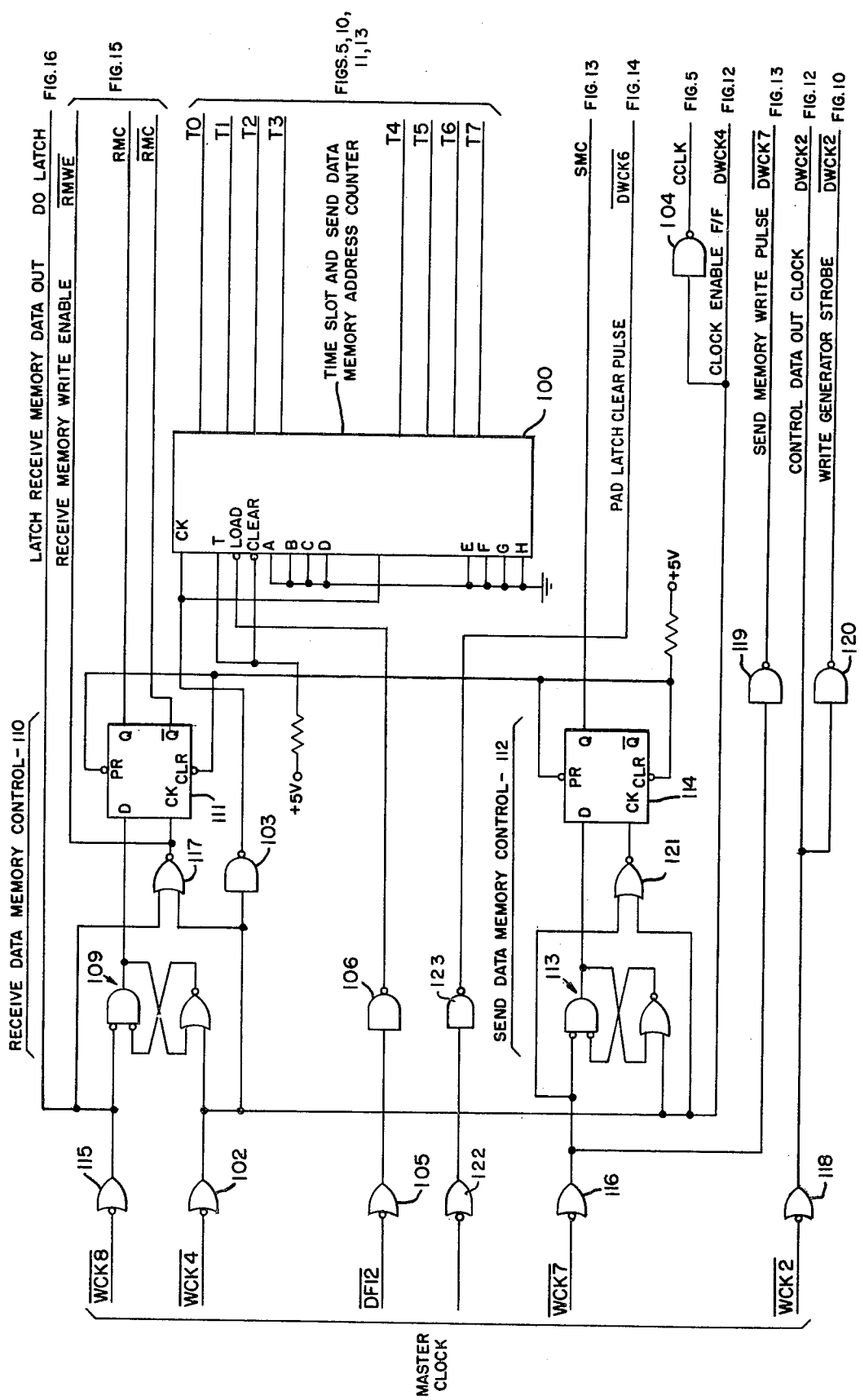
FIGS. 4 and 5 are schematic circuit diagrams of the clock and memory control circuit.
Figure 5:
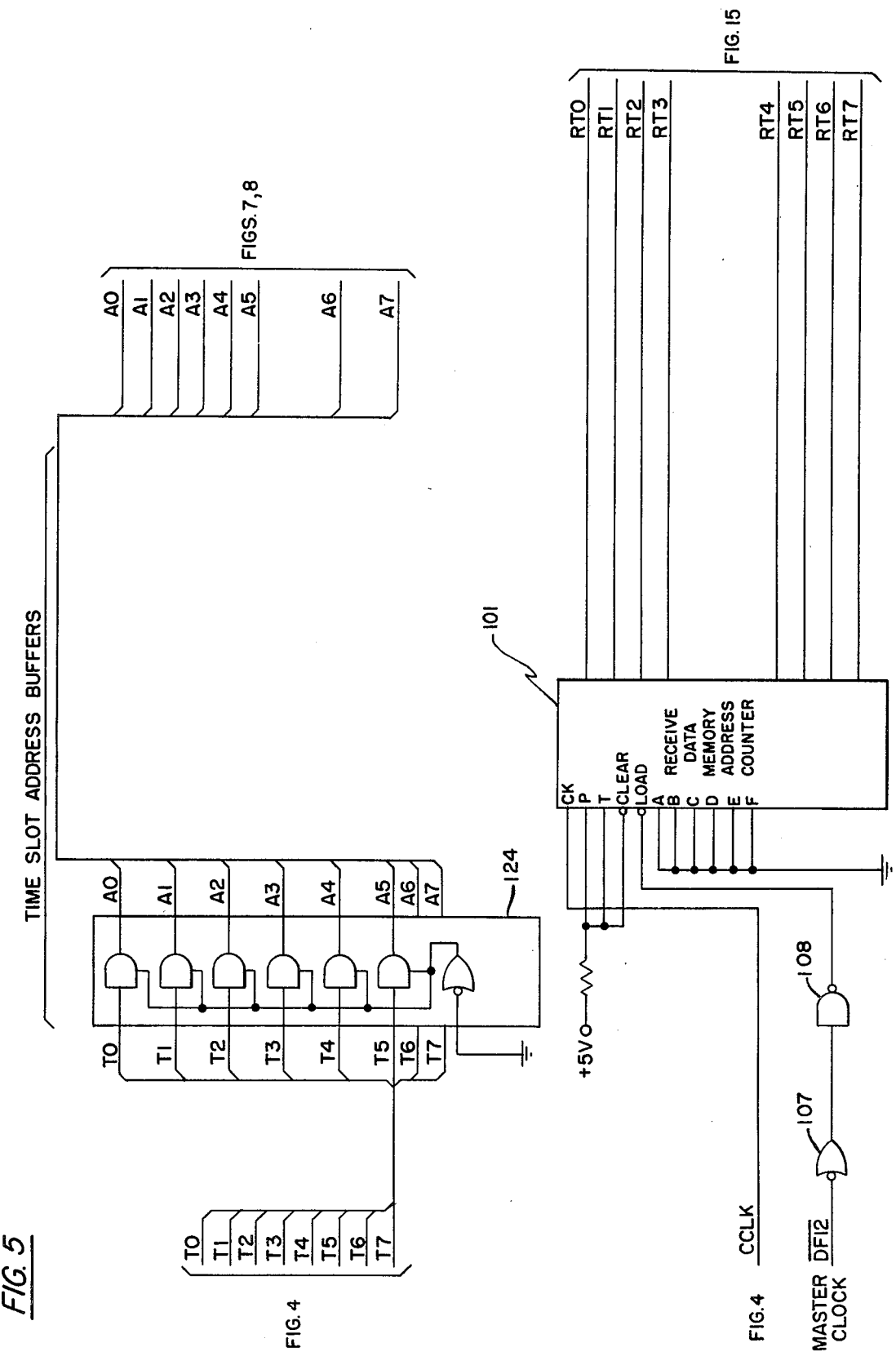
Figure 6:
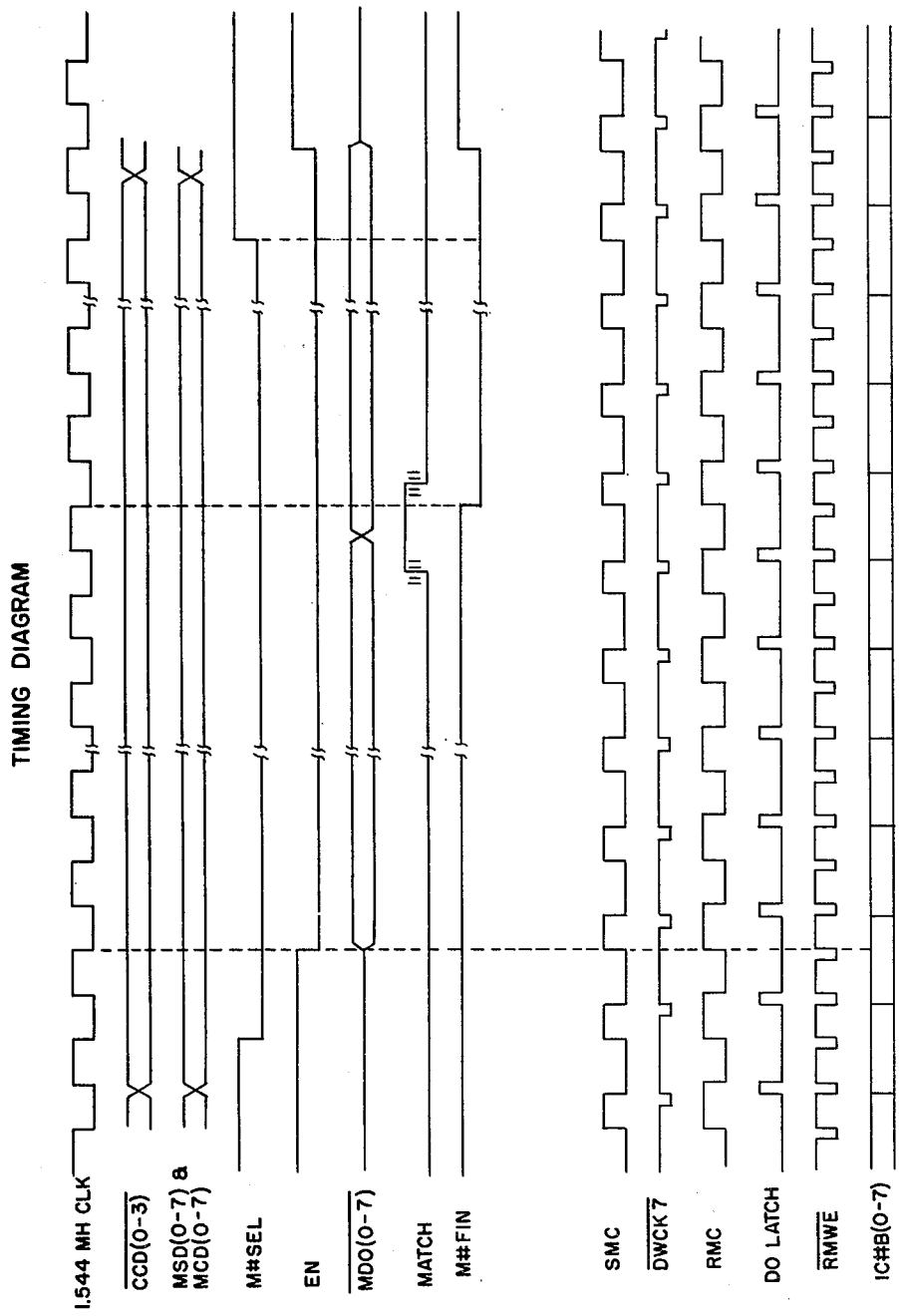
FIG. 6 is a wave timing diagram relating to the circuit of FIGS. 4 and 5.

The clock and memory control circuit 12 is illustrated in greater detail in FIGS. 4 and 5, and the operation of this circuit can be determined from the timing diagram illustrated in FIG. 6. The clock and memory control circuit accepts clock signals from the master clock (FIG. 3) and regenerates the internal clock and memory control signals required for time slot interchange and store memory programming. All internal timing is synchronized to these input clock signals.

The time slot and send data memory address counter 100 and the receive memory address counter 101 are each eight stage counters which provide up to 256 distinct addresses for memory control (256 time slots). The counter 100 is incremented by the positive going transition of timing signal $\overline{WCK4}$ from the master clock applied through Schmitt trigger circuit 102 and gate 103; while, the counter 101 is incremented in a similar manner from the output of Schmitt trigger circuit 102 via gate 104 on lead CCLK. Both of the counters 100 and 101 are synchronized to the zero condition in coincidence with the external load signal supplied by the master clock on lead $\overline{DF12}$ supplied to counter 100 via Schmitt trigger circuit 105 and gate 106 on the one hand, and supplied to counter 101 via Schmitt trigger circuit 107 and gate 108 on the other hand. The counter 100 supplies the address data for the send memory 10 during the input portion of the send memory cycle and continuous address data for the store memory 14. The receive data memory address counter 101 supplies the address for the receive data memory 11 during the output portion of the receive memory cycle.

The send and receive data memories 10 and 11 are time shared for the input-output function and real time data transfer (time slot interchange). In this regard, the control signals RMC and SMC generated by the receive data memory control 110 and send data memory control 112, respectively, in FIG. 4 are the control signals which designate the operating mode for the memories 10 and 11, logic 1 indicating input and output, while logic 0 indicates data transfer. The receive data memory control 110 consists of a crossed NOR latch 109 and a D flip-flop 111. A low-going pulse on lead $\overline{WCK4}$ from the master clock via Schmitt trigger circuit 102 sets the flip-flop 111 via gate 117 to place a logic 1 on the lead RMC; while, a low-going pulse on lead $\overline{WCK8}$ from the system clock resets the latch 109 and provides a logic 0 to the D input of flip-flop 111. The positive-going edge of $\overline{WCK8}$ resets the flip-flop and provides a logic 0 on lead RMC.

The send data memory control 112 operates in a manner similar to the control 110 in that the flip-flop 114 is set on a receipt of a low-going pulse on lead $\overline{WCK4}$ produced at the output Schmitt trigger circuit 102 via gate 121 and the output of latch 113 to produce a logic 1 on lead SMC. However, the transfer function for the send data memory control 112 is initiated earlier by the positive-going transition of lead $\overline{WCK7}$ from the master clock, which resets the latch 113 and the flip-flop 114 to place a logic 0 on the lead SMC. The send transfer cycle is initiated earlier to partially compensate for the memory access time and propagation delay through the cross office expander/concentrator circuit 20.

All other clock signals are directly regenerated from the clock signals received from the master clock with the exception of the receive data memory clock $\overline{RMWE}$, which is a double clock pulse produced at the output of gate 117 by both $\overline{WCK4}$ and $\overline{WCK8}$. The $\overline{WCK8}$ component of signal of $\overline{RMWE}$ is used to erase the receive memory after data output and the $\overline{WCK4}$ component of the signal $\overline{RMWE}$ is used to write in the transferred data during the transfer portion of the receive memory cycle.

The pad latch clear pulse $\overline{DWCK6}$ is generated at the output of gate 123 from the output of Schmitt trigger circuit 122 in response to the timing signal $\overline{WCK6}$. The send memory write pulse $\overline{DWCK7}$ is generated at the output of gate 119 from the output of Schmitt trigger circuit 116 in response to the timing signal $\overline{WCK7}$ from the master clock; while, the write generator strobe signal $\overline{DWCK2}$ is generated at the output of gate 120 from the output of Schmitt trigger circuit 118. The clock enable flip-flop signal $\overline{DWCK4}$ is merely the regeneration of the clock signal $\overline{WCK4}$ provided from the output of Schmitt trigger circuit 102. The latch receive data memory data-out signal DO LATCH is generated from the output of Schmitt trigger circuit 115 and is the regeneration of the timing signal $\overline{WCK8}$.

As seen in FIG. 5, the time slot signals T0–T7 provided from the counter 100 are supplied through buffer circuit 124 on leads A0–A7 to the store memory 14, as well as to the pad store 24. The store memory 14, which is illustrated in more detail in FIGS. 7 and 8 contains the address data which controls the time slot interchange during the transfer portion of the send and receive data memory cycles. For this purpose, the store memory 14 comprises twenty-three registers 125–147 each of which provides 256 memory locations responsive to an eight bit address. Registers 125–133 comprise the send store memory and provide for the storage of eight address bits and an active/$\overline{\text{active}}$ bit provided on output leads S0–S7 and SA when the registers are addressed. The eight address bits permit anyone of the 256 memory locations in the send data memories to be addressed during the data transfer portion of the send data memory cycle. The active/$\overline{\text{active}}$ bit SA inhibits data transfer when set to the active condition (logic 1). The data level condition in the matrix is logic level 1, with data inhibit being indicated by logic 0 or idle condition.

The receive store memory comprises registers 134–142 for storing eight address bits and an active/$\overline{\text{active}}$ bit provided on output leads R0–R7 and RA when the registers are addressed, and its function is similar to that of the send store memory except that the active/$\overline{\text{active}}$ bit RA deselects the receive data memories when set to the active condition (logic 1) which prevents destruction of the data stored in the receive data memories.

The cross office highway store memory comprises registers 143–147 and is capable of storing five address bits. Bit 4 selects one of the two eight bit cross office highways from the expander/concentrator 20, while bits 0–3 are connected on leads X0–X3 through drivers 148–151 (FIG. 12) to leads M#X0–M#X3 providing the steering address data required by the expander/concentrator.

Data in the store memory 14 is sequentially addressed under control of the time slot and send data memory address counters in the clock and memory control 12. The data remains stable except during execution of the store memory write commands issued by the controller 4 and received on leads MSD0–MSD7 in FIG. 7. Time slot interchange is not affected during execution of store memory commands except for the obvious case of the specific time slots involved in a store memory write command.

Figure 8:
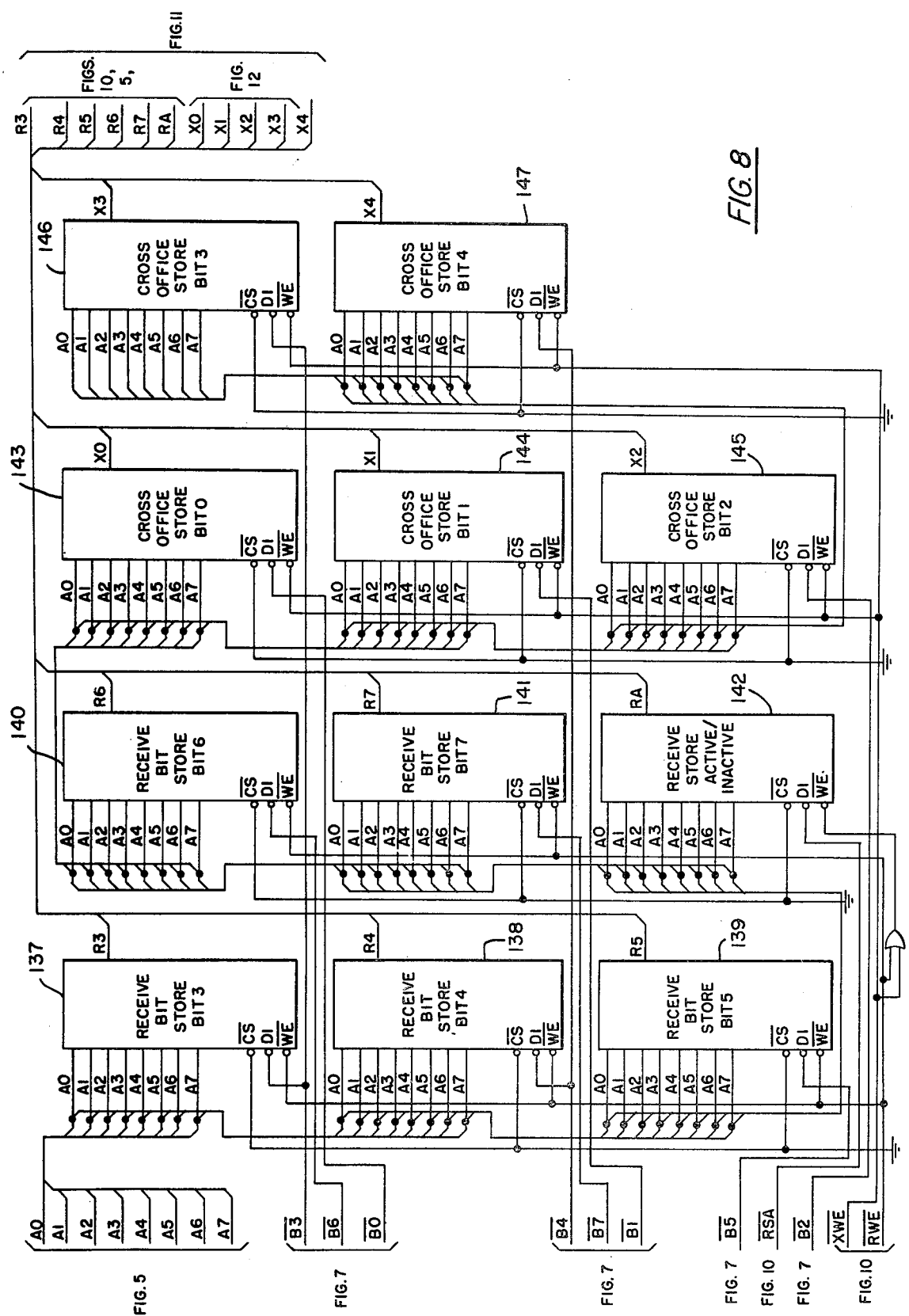
Figure 9:
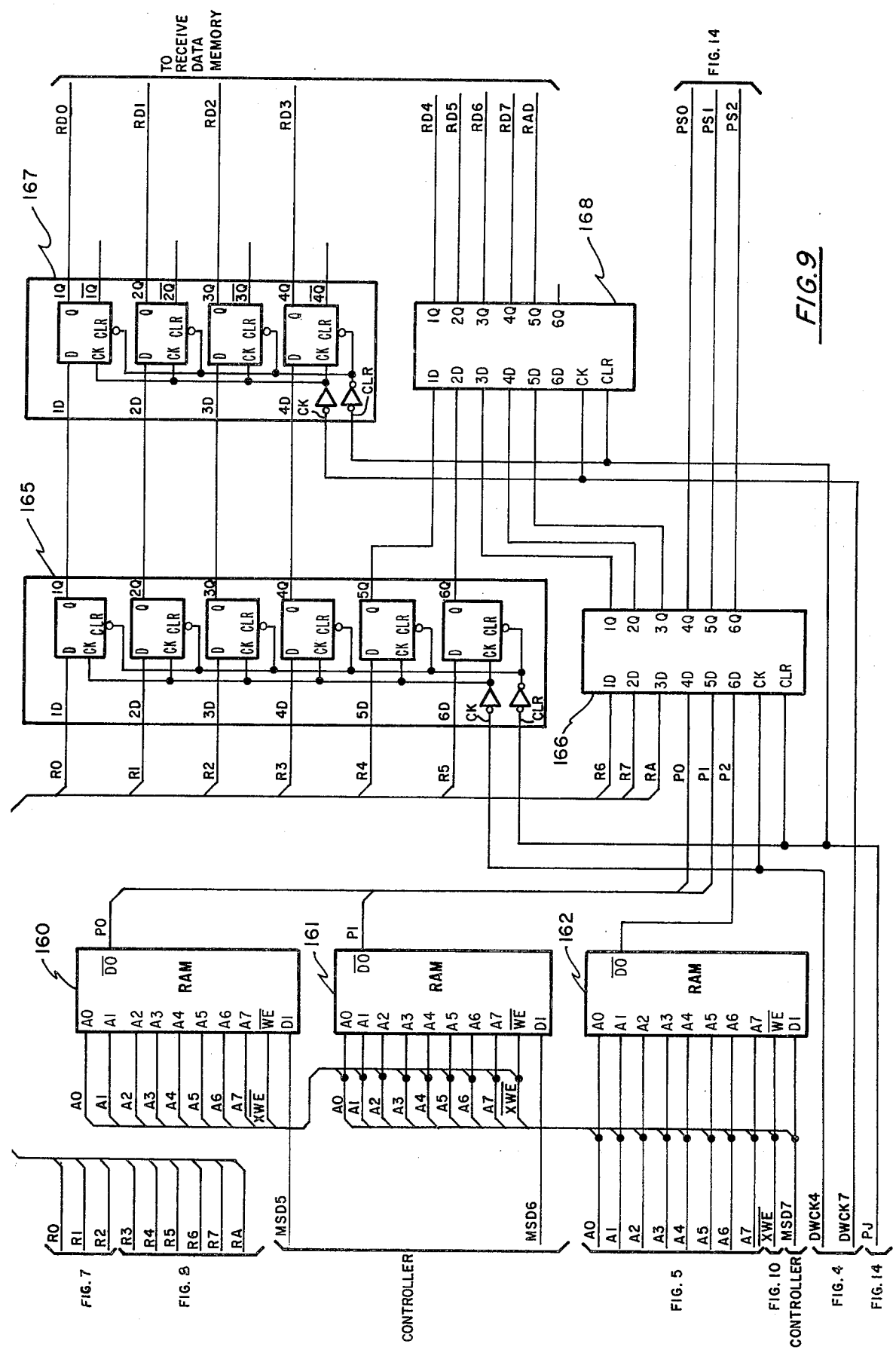
FIG. 9 is a schematic circuit diagram of the pad store forming part of the present invention.

The pad store 24, although illustrated separately in FIG. 2 for purposes of more clearly indicating those portions of the system which relate to the present invention, may be considered as part of the store memory 14 from a functional point of view. The pad store 24 is illustrated in detail in FIG. 9, and comprises three random access memories (RAM) 160, 161, and 162 for storing the three bits of a pad identification code which designates which pad is to be connected in the transmission path in each cross office time slot. For this purpose the time slot signals A0–A7 generated by the clock and memory control 12 (FIGS. 8 and 9) are applied to each of the RAMs 160, 161, and 162 to address the memory locations thereof for reading the three pad designation bits out on leads P0, P1, and P2. Similarly, data provided the CPU via the controller 4 on leads MSD5, MSD6, and MSD7 will be written into the memories 160, 161, and 162 when the write enable lead $\overline{\text{XWE}}$ is active.

The address derived from the receive store memories 134–142 on leads R0–R7 and RA are applied to a pair of identical latches 165 and 166 along with the pad designation bits P0–P2 from RAMs 160–162 upon receipt of the timing signal DWCK4 to hold these addresses during the first portion of the time slot. Upon receipt of the timing signal DWCK7 during the second half of the time slot, the receive memory address bits R0–R7 and RA are clocked into a pair of latches 167 and 168 while the pad designation bits PS0, PS1, and PS2 are applied to the digital pads 25.

The matrix switch executes eleven distinct commands which basically can be grouped into three fundamental type operations: read, write, and search. Control of the store memory 14 is provided by the control signals $\overline{\text{SWE}}$, $\overline{\text{RWE}}$, and $\overline{\text{XWE}}$ provided by the store control logic circuit 13 in response to commands from the controller 4. In the absence of any command from the controller 4, the store control logic 13 will be in the idle condition and time slot interchange in the matrix switch will proceed in accordance with the prior programmed data stored in the send, receive, and cross office store memories indefinitely in response to the successively received time slot signals on leads A0–A7 from the clock and memory control circuit 12.

Figure 10:
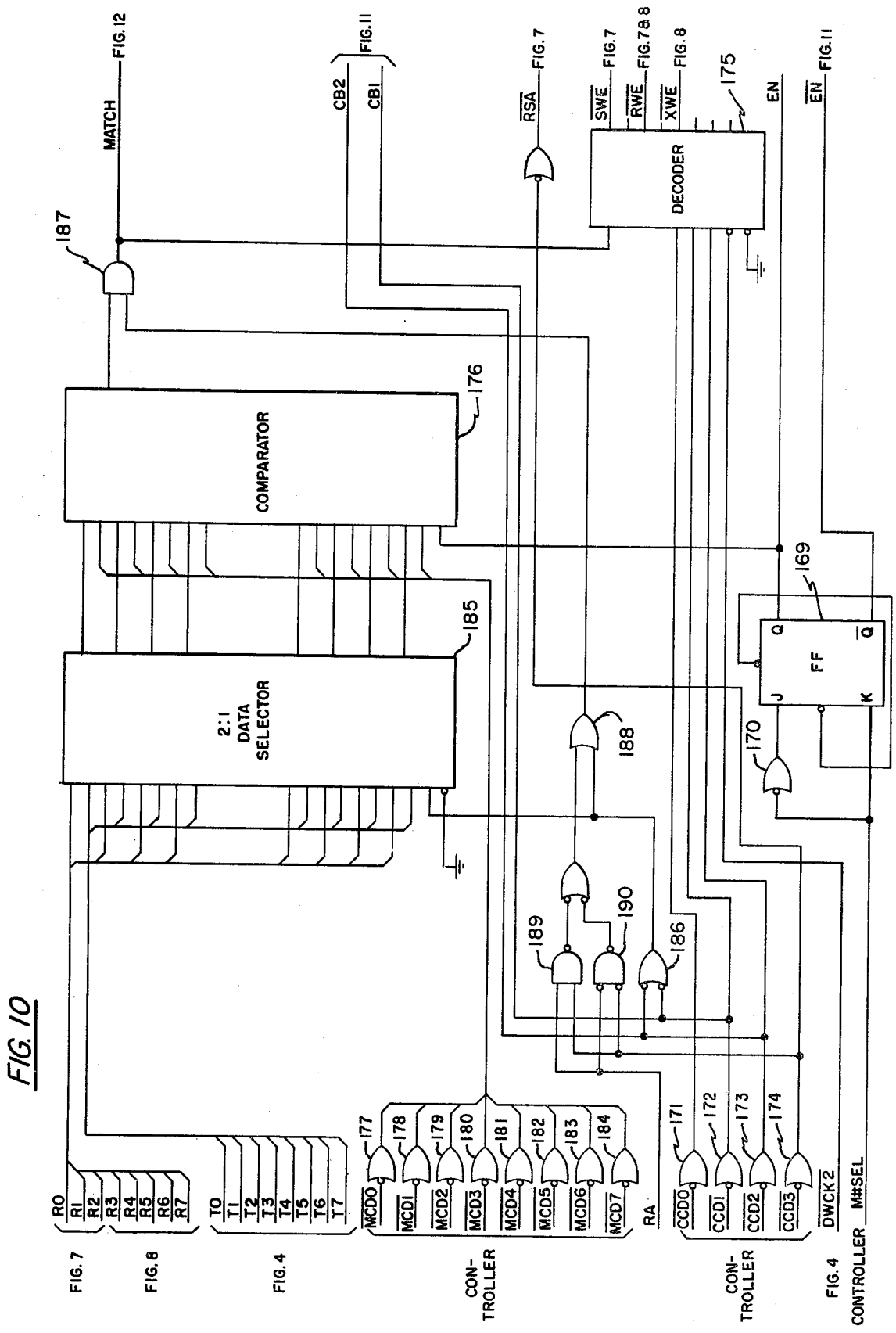
FIG. 10 is a schematic circuit diagram of the store control logic circuit.

The store control logic circuit 13 is illustrated in greater detail in FIG. 10. Command execution from the controller 4 is initiated when the $\overline{\text{M\#SEL}}$ lead goes low to set the enable flip-flop 169 via Schmitt trigger circuit 170 to provide an enable signal on the lead EN to the control data output circuit 15. The data received from the controller 4 on the control bus $\overline{\text{CCD0}}$–$\overline{\text{CCD3}}$ indicates the type of operations to be performed, such as search, write-send, read-send, write-receive, read-receive, write-XOH, and read-XOH. The control signals on leads $\overline{\text{CCD0}}$–$\overline{\text{CCD2}}$ are applied through gates 171–173 to the decoder 175 which decodes these signals and produces one of the outputs $\overline{\text{SWE}}$, $\overline{\text{RWE}}$, and $\overline{\text{XWE}}$, representing the send write enable signal, and receive write enable signal, and the cross office write enable signal for controlling the writing of address data into the store memory 14 and the pad store 24.

At this point, it should be noted that upon generation of the cross office write enable signal $\overline{\text{XWE}}$ at the output of decoder 175 data will be read into both the cross office store memories 143–147 (FIG. 8) and the pad store rams 160–162 (FIG. 9) from the CPU via the controller 4. In this regard data access to the pad store is gained through the last three bits of the cross office highway data byte appearing on leads MSD5–MSD7. This eliminates the need to provide a separate pad store write command, but requires that the pad store be written at the same time as the cross office store memories 143–147. Neither the cross office store nor the pad store memories can be written independently.

The bus comprising leads $\overline{\text{MCD0}}$–$\overline{\text{MCD7}}$ from the controller 4 provides one of the data inputs to the comparator circuit 176 via Schmitt trigger circuits 177–184. A data selector 185 supplies to the comparator 176 either the address read from the store memory 14 on leads R0–R7 or the time slot signals provided from the clock and memory control circuit 12 on leads T0–T7 in accordance with the output of gate 186 as determined by the information provided on leads $\overline{\text{CCD1}}$ and $\overline{\text{CCD2}}$ through the Schmitt trigger circuits 172 and 173.

Figure 7:
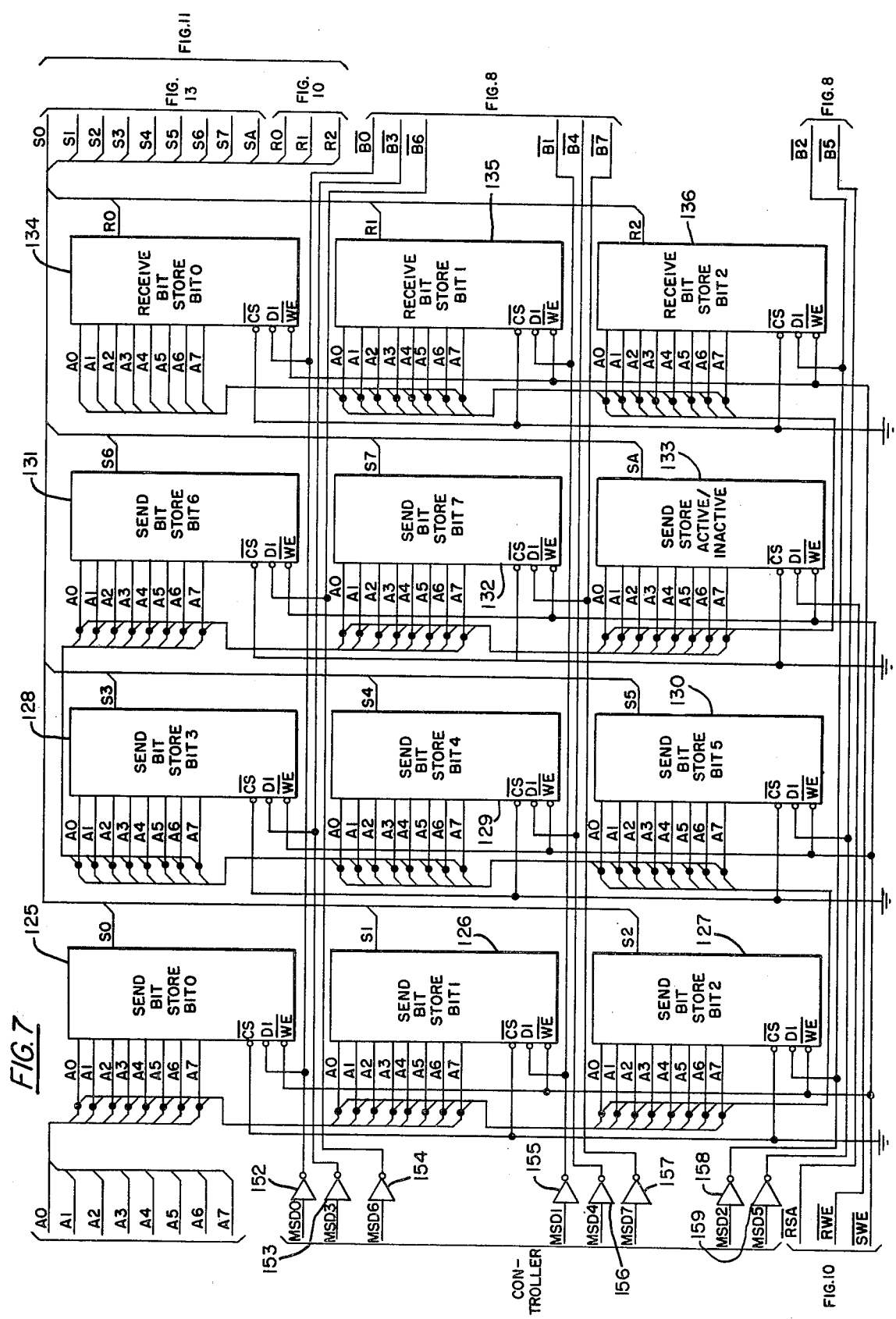
FIGS. 7 and 8 are schematic diagrams of the store memory.

The negative-going transition of DWCK4 applied to enable flip-flop 169 transfers the $\overline{\text{M\#SEL}}$ status signal therethrough. When the lead $\overline{\text{M\#SEL}}$ goes low, the flip-flop 169 is set so as to enable the comparator 176. When the signal on DWCK4 is again inverted, the positive-going transition of the inverted clock pulse $\overline{\text{WCK4}}$ increments the time slot and send data memory address counter 100, the outputs of which are distributed on the address bus to the store memory 14 via leads A0–A7, as seen in FIG. 7. Thus, the store memory addresses are changed sequentially in synchronism with the signal on lead $\overline{\text{WCK4}}$. As noted previously, there are three basic commands: read, write, and search. Successful execution of each command requires that the $\overline{\text{MCD0-MCD7}}$ data applied through Schmitt trigger circuits 177–184 from the controller 4 to the comparator 176 in FIG. 10 agrees with the internal data supplied by the matrix store memory 14. When the data compares, a match signal is generated at the output of AND gate 187. Under normal conditions, assuming a comparison can be obtained, the maximum time required to find the match in the store is one complete counter and memory cycle. On the average, it would be expected that the cycle time would be one-half a counter cycle.

For read and write commands, the data on leads $\overline{\text{MCD0-MCD7}}$ from the controller is compared against the counter output on leads T0–T7 (the store memory address). The match gate is enabled by the read+-write+active compare logic signal produced at the output of gate 188 to enable the gate 187. For search commands, the receive store active/active bit on lead RA from the store memory 14 (FIG. 8) is applied to gates 189 and 190 along with the active/active bit from the controller provided on lead $\overline{\text{CCD3}}$ through Schmitt trigger 174. The bits must compare to enable the match gate 187.

Figure 11:
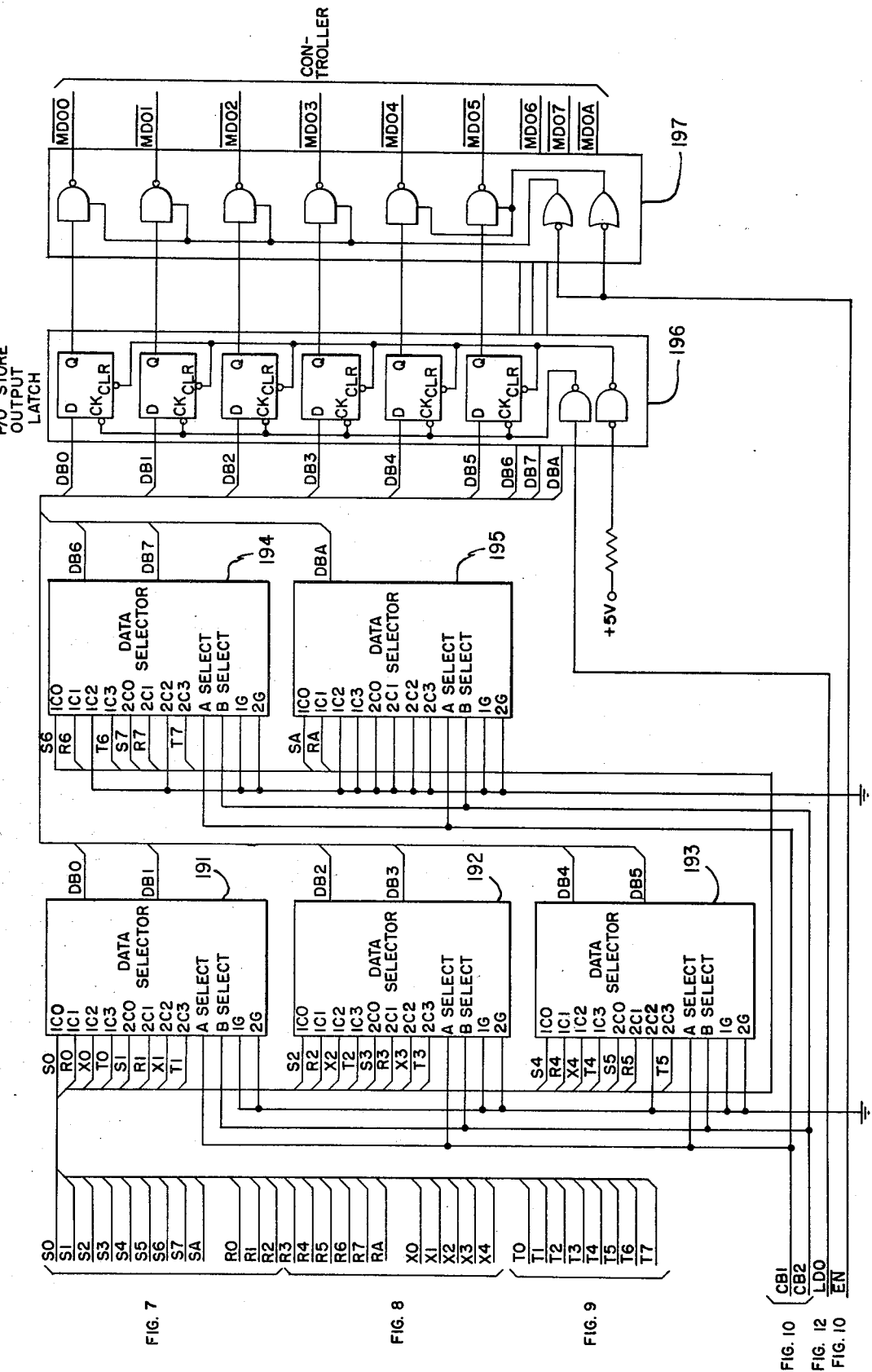
FIGS. 11 and 12 are schematic circuit diagrams of the control data output circuit.
Figure 12:
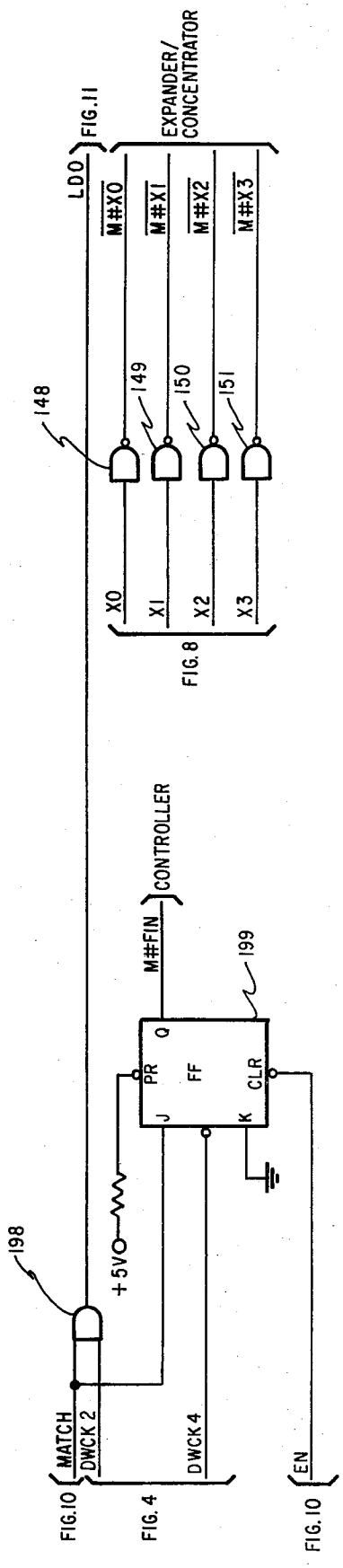

The details of the control data output circuit 15 are illustrated in FIGS. 11 and 12. The basic function of this circuit is to store the data received from the store memory 14 in response to a request from the controller 4 for review of the stored data. For this purpose, the circuit 15 includes data selectors 191–195, as seen in FIG. 11. The send data is received from the store memory 14 on leads S0–S7 and SA; the receive data is provided on leads R0–R7 and RA; the cross office highway data is applied on leads X0–X4, and the time slot signals T0–T7 are received from the clock and memory control 12. The data selectors 191–195 each receive two bits from each field of data which is selected by the select gate inputs CB1 and CB2 derived from the outputs of gates 172 and 173 in FIG. 10. The data selected by the data selectors 191–195 is provided on leads DB0–DB7 and DBA to an output latch circuit 196 comprising a plurality of D type flip-flops into which the data bits are inserted for storage in response to the load output signal LDO. The data stored in the latch 196 then can be gated through the gate circuit 197 in response to the enable signal $\overline{\text{EN}}$ onto leads $\overline{\text{MD00}}$ through $\overline{\text{MD07}}$, $\overline{\text{MD0A}}$, and $\overline{\text{M\#FIN}}$ to the CPU via the controller 4.

The load signal LDO is generated in FIG. 12 at the output of gate 198 in response to receipt of the MATCH signal from the store logic control 13 at the output of gate 187 in FIG. 10 along with the timing signal DWCK2 from the clock and memory control circuit 12. A finish flip-flop 199 is responsive to a clock signal DWCK4, the enable signal EN from the store control logic circuit 13 at the output of the enable flip-flop 169 in FIG. 10 and the MATCH signal at the output of gate 187 in FIG. 10 to produce an output on lead $\overline{\text{M\#FIN}}$ from the gate circuit 197 in FIG. 11 to the controller 4 indicating that the operation has been completed.

Figure 13:
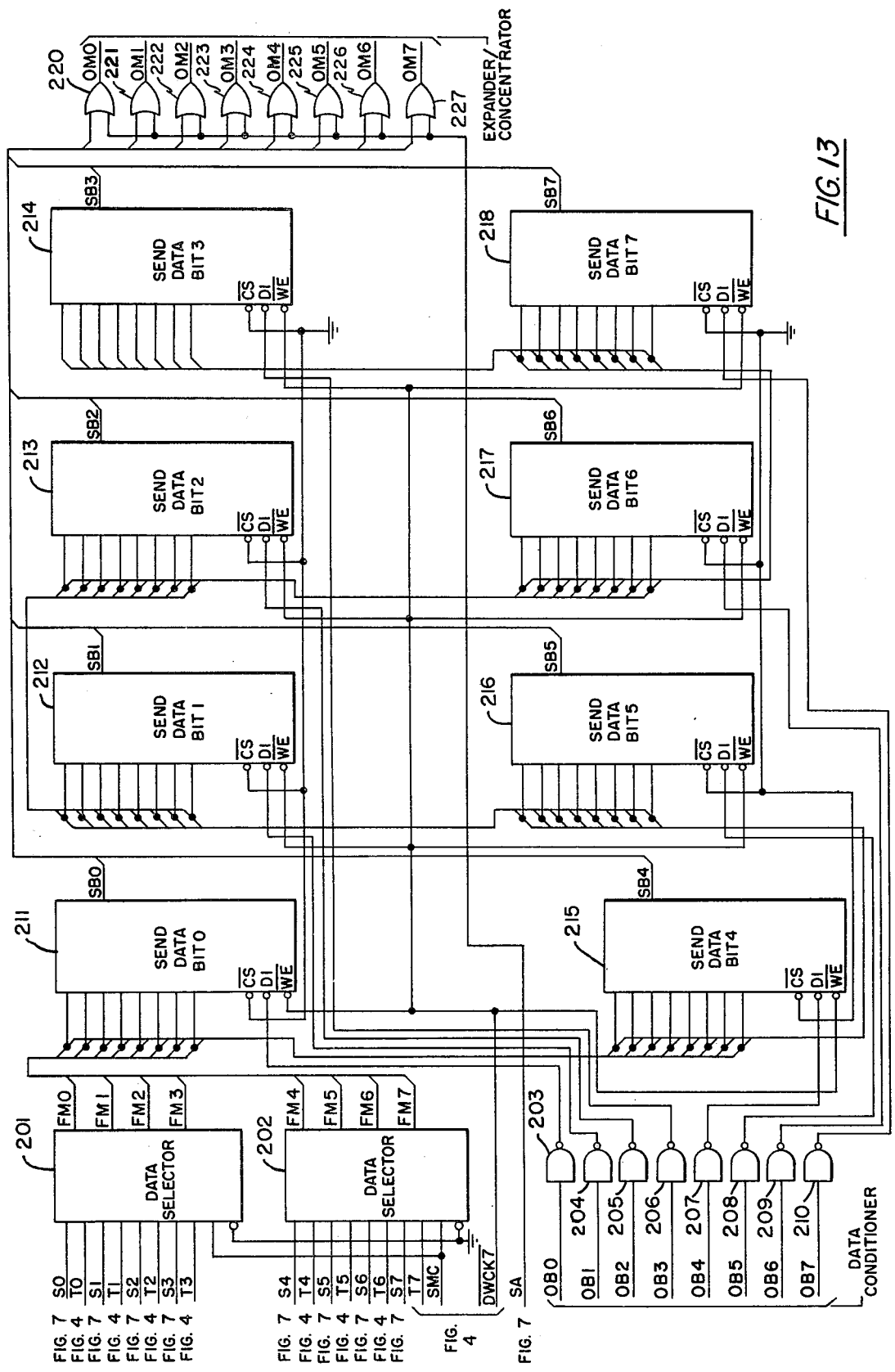
FIG. 13 is a schematic circuit diagram of the send data memory.

The send data memory 10 is illustrated in more detail in FIG. 13, and includes a pair of data selector circuits 201 and 202 receiving a first address field comprising the time slot signals T0–T7 generated from the clock and memory control 12 and a second address field comprising the send address information S0–S7 received from the store memory 14. Depending upon the state of the control lead SMC to each of these selector circuits, either the first or the second address field will be applied by the selector circuits to the output leads FM0–FM7 to each of a plurality of send data registers 211–218, to each of which registers there is also provided one of the data bits received from the data conditioner on leads OB0–OB7 through Schmitt trigger circuits 203–210. The outputs SB0–SB7 from the send data registers 201–210 are provided through gates 220–227 to the expander/concentrator 20 on leads OM0–OM7 provided the gates have not been disabled via the active/$\overline{\text{active}}$ lead SA from the store memory 14.

As indicated in the description of the clock and memory control circuit 12 in FIG. 4, the positive-going transition of $\overline{\text{WCK4}}$ initiates the input cycle for the send memory 10 and the output cycle for the receive memory 11 by generating the control signals RMC and SMC at the output of the flip-flops 111 and 114, respectively. A logic 1 on the control lead SMC to the data selectors 201 and 202 in FIG. 13 will gate the time slot signal represented by the condition on leads T0–T7 to each of the send data registers 211–218 on leads FM0–FM7 at the same time that a word is received from the data conditioner on leads OB0–OB7 via Schmitt trigger circuits 203–210. The received word is therefore written into the send data registers 211–218 upon receipt of the timing signal $\overline{\text{DWCK7}}$ at the address designated by the time slot signals T0–T7.

During the transfer cycle when the control lead SMC goes to logic 0, the data selector circuits 201 and 202 will apply the send address information on leads S0–S7 to the leads FM0–FM7 which extend to each of the send data registers 211–218. Thus, the data stored in these registers at the particular address designated by the leads S0–S7 will be gated out through gates 220–227 to the expander/concentrator 20, provided these gates are not inhibited by the condition of lead SA.

Figure 14:
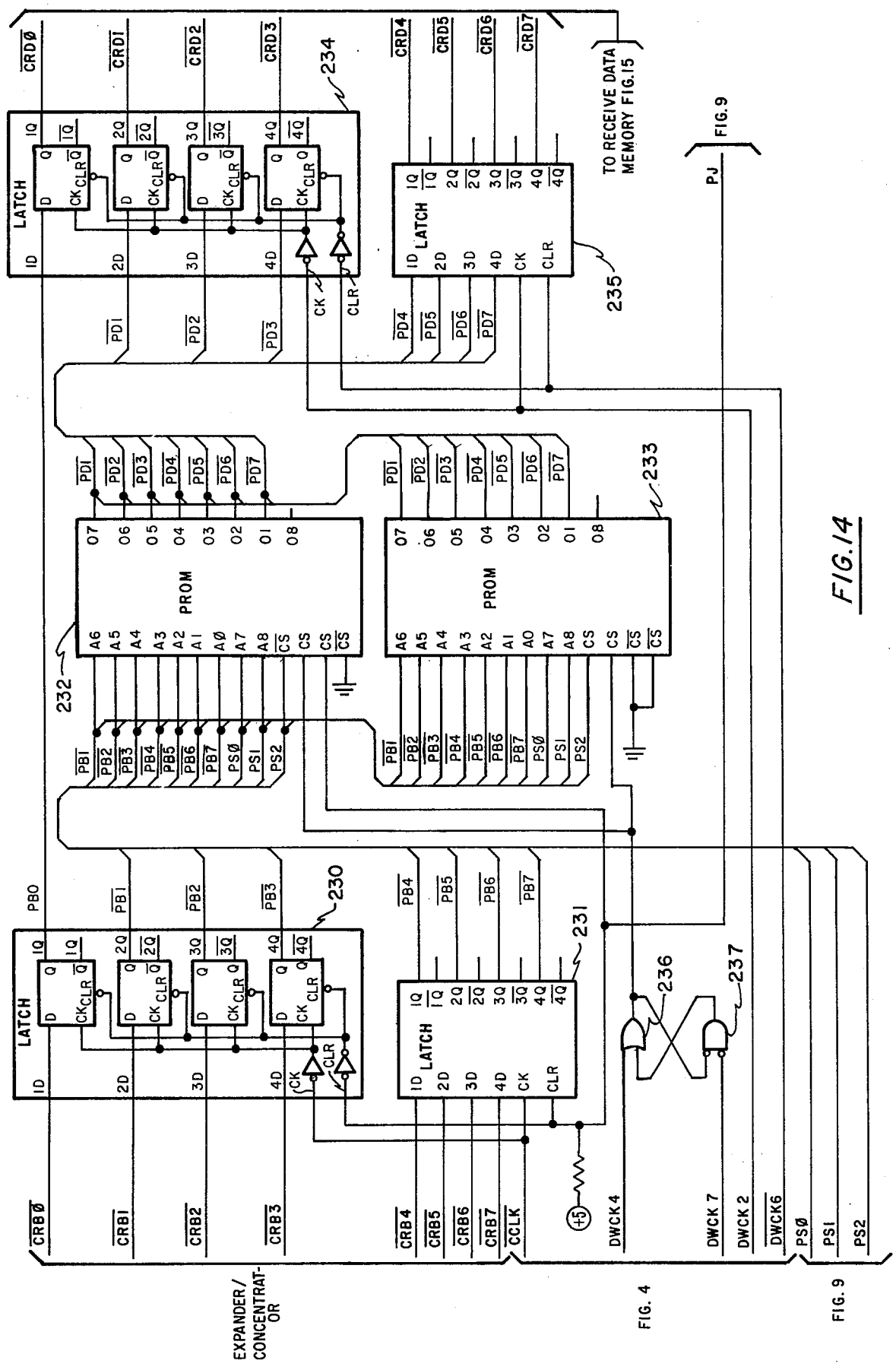
FIG. 14 is a schematic circuit diagram of the circuit providing the digital pads in accordance with the present invention.

The data word gated out of the send data registers 211–218 in the send data memory 10 are applied through the expander/concentrator 20 to the digital pads 25, which are illustrated in detail in FIG. 14. The PCM data is provided on leads $\overline{\text{CRB0-CRB7}}$ to a pair of input latches 230 and 231 where the data word is stored with receipt of the clock signal $\overline{\text{CCLK}}$.

The digital pads are formed by a pair of 512 by 8 bit bipolar programmable read only memories 232 and 233, each PROM providing four pads of 128 data points each. Each pad preferably provides a different value of insertion also, although one of the pads may provide zero insertion loss to accommodate those communication connections for which the nominal insertion loss of the system is suitable. Each data point within a given pad is responsive to a different level of the data in the transmission path to provide an output at a level adjusted by the designated insertion loss of the particular pad. Thus, the data word stored in the input latches 230 and 231 is applied on leads $\overline{\text{PB1-PB7}}$ as an address to both of the PROMs 232 and 233. The least-significant bit $\overline{\text{PB0}}$ of the data word will not be altered, and therefore, it is not applied to the PROMs.

Pad selection is effected on the basis of the selection bits PS0–PS2 received from the pad store 24. The bit PS2 is a chip select bit which enables either PROM 232 or PROM 233, while bits PS0 and PS1 select one of the four pads in each PROM. The PROMs 232 and 233 are also enabled at a particular time during each time slot by the output of cross coupled gates 236 and 237 at DWCK4, the output being disabled at DWCK7. The level adjusted data word is then applied to a pair of output latches 234 and 235 on leads $\overline{PB0}$ and $\overline{PD1}$–$\overline{PD7}$ at DWCK2, where the adjusted data is then available for transfer on leads $\overline{CRD0}$–$\overline{CRD7}$ to the receive data memory 11.

The receive data memory 11 is similar to the send data memory 10, as indicated in FIG. 15. The receive data memory 11 includes data selector circuits 238 and 239 which select either the receive time slot address generated by the clock and memory control 12 from the receive data memory address counter 101 in FIG. 5 appearing on leads RT0–RT7 or the receive address data received from the store memory 14 on leads R0–R7. The selector circuits 238 and 239 are controlled by the control signal RMC generated from the output of flip-flop 111 in FIG. 4 upon receipt of the timing signal $\overline{WCK4}$ at the Schmitt trigger circuit 102, as already described.

When the signal RMC is equal to logic 1, the time slot signals appearing on leads RT0–RT7 are applied by the data selector circuits 238 and 239 to the leads RM0–RM7 which extend to each of a plurality of receive data registers 240–247. Upon generation of the timing signal $\overline{RMWE}$ from the output of gate 117 in FIG. 4 as a result of either the clock signal $\overline{WCK4}$ or the clock signal $\overline{WCK8}$, data received from the digital pads 25 on leads $\overline{CRD0}$–$\overline{CRD7}$ will be stored in the registers 240–247 as storage locations designated by the receive time slot signals RT0–RT7. During the subsequent input cycle, when the control lead RMC is equal to logic 1, the selector circuits 238 and 239 will apply the receive address signals R0–R7 from the store memory 14 to the leads RM0–RM7 which extend to each of the receive data registers 240–247.

At this time, on the negative-going transition of $\overline{WCK8}$ from the clock and memory control 12, the data stored in the receive data registers 240–247 at the address indicated by the receive address leads R0–R7 will be transferred out on leads RB0–RB7 to the data out latches in FIG. 16, where the data is stored in response to receipt of the DO LATCH signal generated from the clock and memory control 12. This data stored in the data out latches 250 and 251 is provided on leads IB-0–IB7 to the data conditioner.

Thus, as seen from the foregoing description, since all PCM data must pass through the pad control circuit, any positive loss or gain which has been programmed into the PROM can be inserted into any transmission path. In this way, the proper insertion loss for each type of port-to-port connection may be provided in a very simple and reliable manner.

While I have shown and described an embodiment in accordance with the present invention, it is understood that the same is not limited thereto but is susceptible of numerous changes and modifications as known to those of ordinary skill in the art, and I, therefore, do not wish to be limited to the details shown and described herein but intend to cover all such changes and modifications as are obvious to those skilled in the art.

I claim:

1. In a digital transmission system including a send memory, a receive memory, transfer means connecting said send memory to said receive memory and memory control means for selectively effecting transfer of digital data stored in addressable memory locations of said send memory into selected memory locations of said receive memory to establish selective data paths through said transfer means between inputs of said send memory and outputs of said receive memory, the improvement comprising impedance control means connected in said data paths for controlling the insertion loss of said data paths by selectively adjusting the level of said digital data, said impedance control means including programmable memory means for storing a range of adjusted digital values corresponding to a range of levels of digital data carried by said data paths, and means for applying the digital data to said programmable memory means as addresses for the stored adjusted digital values.

2. A digital transmission system as defined in claim 1 wherein said impedance control means is connected between said send memory and said receive memory.

3. A digital transmission system as defined in claim 1 wherein said programmable memory means comprises a memory having at least two groups of memory locations each storing a range of digital values adjusted with respect to said range of levels of digital data by a different amount, and further including, means for selecting one of said groups of memory locations to be addressed by said digital data.

4. A digital transmission system as defined in claim 1 wherein said impedance control means includes a plurality of impedance pads selectively connectable in said data paths between said send memory and said receive memory.

5. A digital transmission system as defined in claim 4 wherein each of said impedance pads comprises a programmable read only memory.

6. A digital transmission system as defined in claim 5 wherein each of said programmable read only memories stores a range of digital values adjusted with respect to a range of levels of digital data carried by said data paths, each of said read only memories providing different amounts of adjustment of said digital data to provide different values of insertion loss in said data paths, and further including, means for selecting said read only memories for connection in said data paths.

7. A digital data transmission system for use in a telephone system including a plurality of subscriber ports to be selectively interconnected by way of data paths through said transmission system, comprising a send memory including a plurality of first data storage locations, timing control means for applying data in digital form from said subscriber ports to said send memory in sequential time slots of a repetitive time frame, a receive memory including a plurality of second data storage locations, transfer means connecting said send memory to said receive memory, store memory control means responsive to said timing control means for transferring data from a selected first data storage location to a designated second data storage location through said transfer means, said timing control means being connected to said receive memory for sending data stored in said second data storage locations to said subscriber ports in the sequential time slots of said repetitive time frame, impedance control means connected in said data paths through said send and receive memories for selectively adjusting the value of said digital data to achieve a desired insertion loss of said data paths, and processor control means responsive to subscriber request signals from said ports for supplying to said store memory control means control data indicating the first and second data storage locations between which data is to be transferred, said impedance control means including pad store means responsive to said control data for storing an indication of the degree of adjustment of said digital data to be effected in each data path to control the insertion loss therein.

8. A digital transmission system as defined in claim 7 wherein said subscriber ports include different types of line circuits and trunk circuits, and said impedance control means includes means responsive to said timing control means and said store memory control means for adjusting the level of said digital data on the basis of the type of subscriber ports interconnected by the data path.

9. A digital transmission system as defined in claim 7 wherein said impedance control means includes programmable memory means for storing a range of adjusted digital values corresponding to a range of levels of digital data carried by said data paths, and means for applying the digital data to said programmable memory means as addresses for the stored adjusted digital values.

10. A digital transmission system as defined in claim 9 wherein said programmable memory means comprises a memory having at least two groups of memory locations each storing a range of digital values adjusted with respect to said range of levels of digital data by a different amount, the output of said pad store means serving to select one of said groups of memory locations to be addressed by said digital data for each data path.

11. A digital transmission system as defined in claim 10 wherein said impedance control means is connected between said send memory and said receive memory.

12. A digital transmission system as defined in claim 7 wherein said impedance control means includes a plurality of impedance pads selectively connectable in said data paths between said send memory and said receive memory.

13. A digital transmission system as defined in claim 12 wherein each of said impedance pads comprises a programmable read only memory.

14. A digital transmission system as defined in claim 13 wherein each of said programmable read only memories stores a range of digital values adjusted with respect to a range of levels of digital data carried by said data paths, each of said read only memories providing different amounts of adjustment of said digital data to provide different values of insertion loss in said data paths, and further including, means for selecting said read only memories for connection in said data paths.

* * * * *